United States Patent
Griffin

[11] Patent Number: 6,079,584
[45] Date of Patent: Jun. 27, 2000

[54] QUICK-ON FILLER NECK CAP

[75] Inventor: Jeffery Griffin, Connersville, Ind.

[73] Assignee: Stant Manufacturing Inc., Connersville, Ind.

[21] Appl. No.: 09/254,516
[22] PCT Filed: Jan. 16, 1998
[86] PCT No.: PCT/US98/00863
 § 371 Date: Mar. 9, 1999
 § 102(e) Date: Mar. 9, 1999
[87] PCT Pub. No.: WO98/31598
 PCT Pub. Date: Jul. 23, 1998

Related U.S. Application Data

[60] Provisional application No. 60/035,394, Jan. 16, 1997.
[51] Int. Cl.[7] .................................................. B65D 41/06
[52] U.S. Cl. .......................... 220/296; 220/297; 220/304; 220/DIG. 33; 220/298
[58] Field of Search .......................... 220/293, 295–298, 220/300, 304, 86.1, 86.2, 582, DIG. 33; 215/331, 332, 222, 356, 357

[56] References Cited

U.S. PATENT DOCUMENTS

| | | |
|---|---|---|
| 1,720,347 | 7/1929 | Reid . |
| 4,093,096 | 6/1978 | Augros . |
| 4,678,097 | 7/1987 | Crute . |
| 4,765,505 | 8/1988 | Harris . |
| 4,787,528 | 11/1988 | Harris et al. . |
| 5,071,020 | 12/1991 | Reutter . |
| 5,395,004 | 3/1995 | Griffin et al. . |
| 5,449,086 | 9/1995 | Harris . |
| 5,480,055 | 1/1996 | Harris et al. . |
| 5,529,201 | 6/1996 | Tallent et al. . |
| 5,540,347 | 7/1996 | Griffin . |
| 5,680,954 | 10/1997 | Arnold et al. . |
| 5,732,841 | 3/1998 | Jocic et al. . |

FOREIGN PATENT DOCUMENTS

| | | |
|---|---|---|
| 2947544 | 11/1979 | Germany . |
| WO 97/34813 | 9/1997 | WIPO . |

*Primary Examiner*—Nathan J. Newhouse
*Attorney, Agent, or Firm*—Barnes & Thornburg

[57] ABSTRACT

A fuel cap (10) and filler neck fitment (14) for receiving the fuel cap. The fuel cap includes an outer member (18) and an inner closure assembly (20) with seal. The cap and fitment both include lugs (28, 36) which interengage when the cap is moved into a closing position to pressurize the seal determined by an improved overriding ratchet arrangement. During removal of the cap, the outer member moves against a spring action for a predetermined arc before the inner closure assembly is moved to disengage the seal. When the seal is disengaged, the spring action takes up the relative motion. Once removed, the cap is retained by an improved tether (74) assembly. The outer member is connected to the inner annular assembly by an improved structural arrangement which allows the outer member to separate under crash impact.

31 Claims, 6 Drawing Sheets

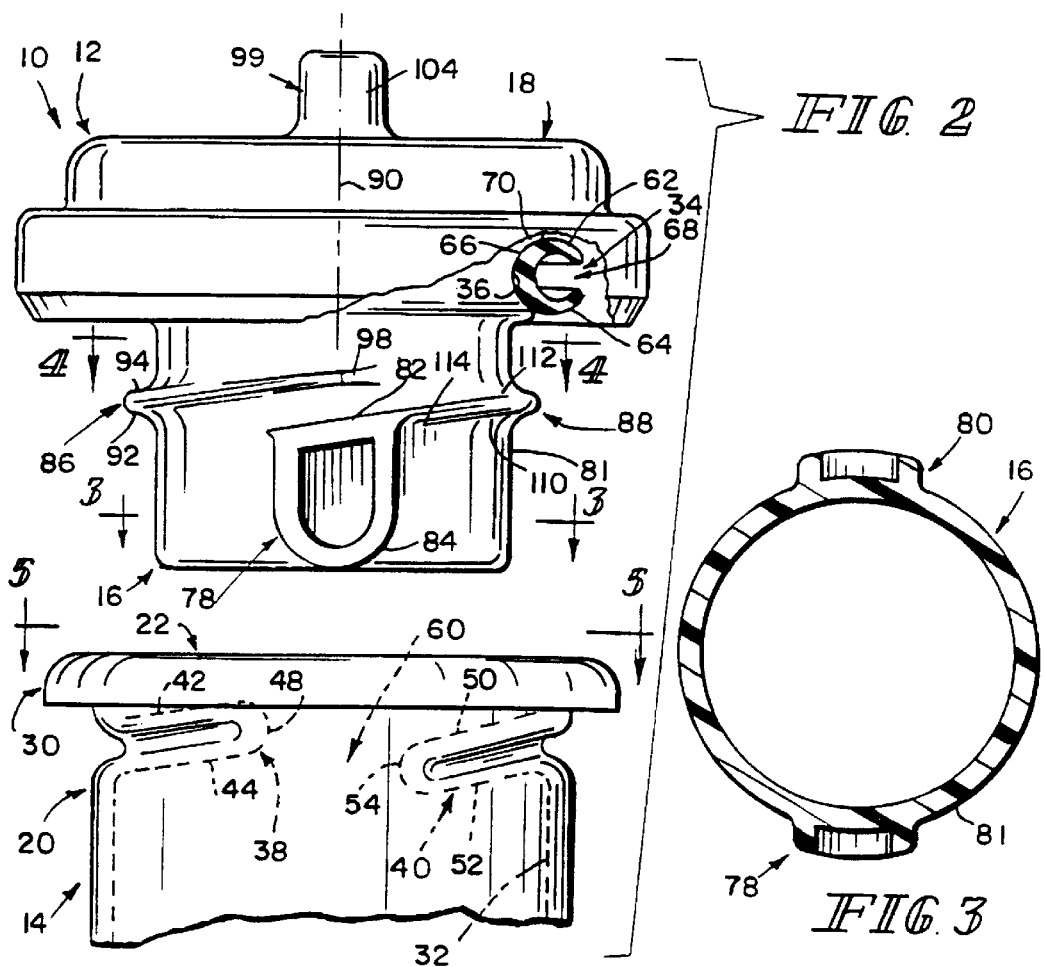
FIG. 2
FIG. 3
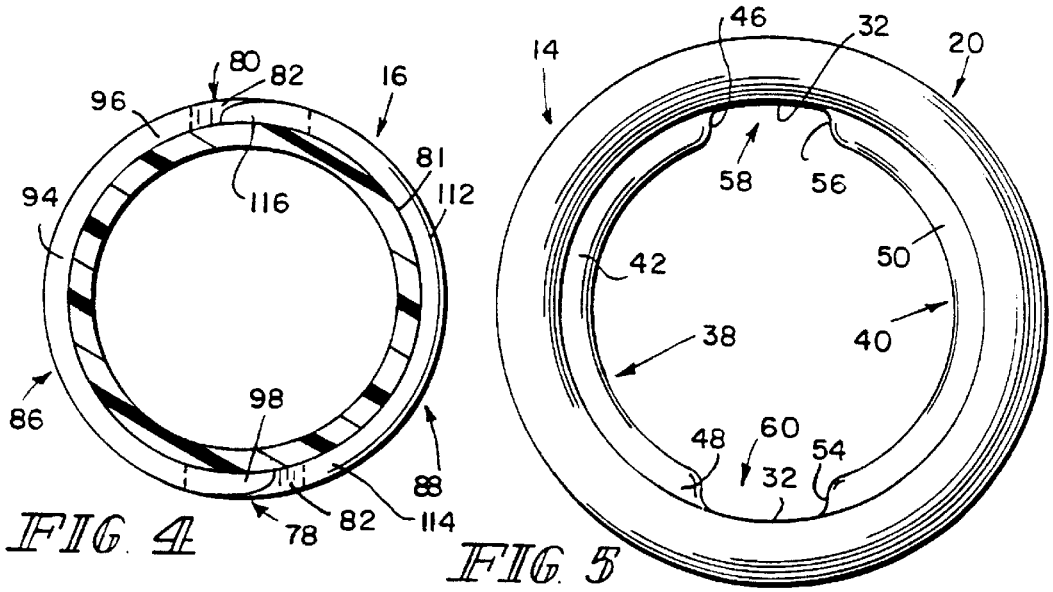
FIG. 4
FIG. 5

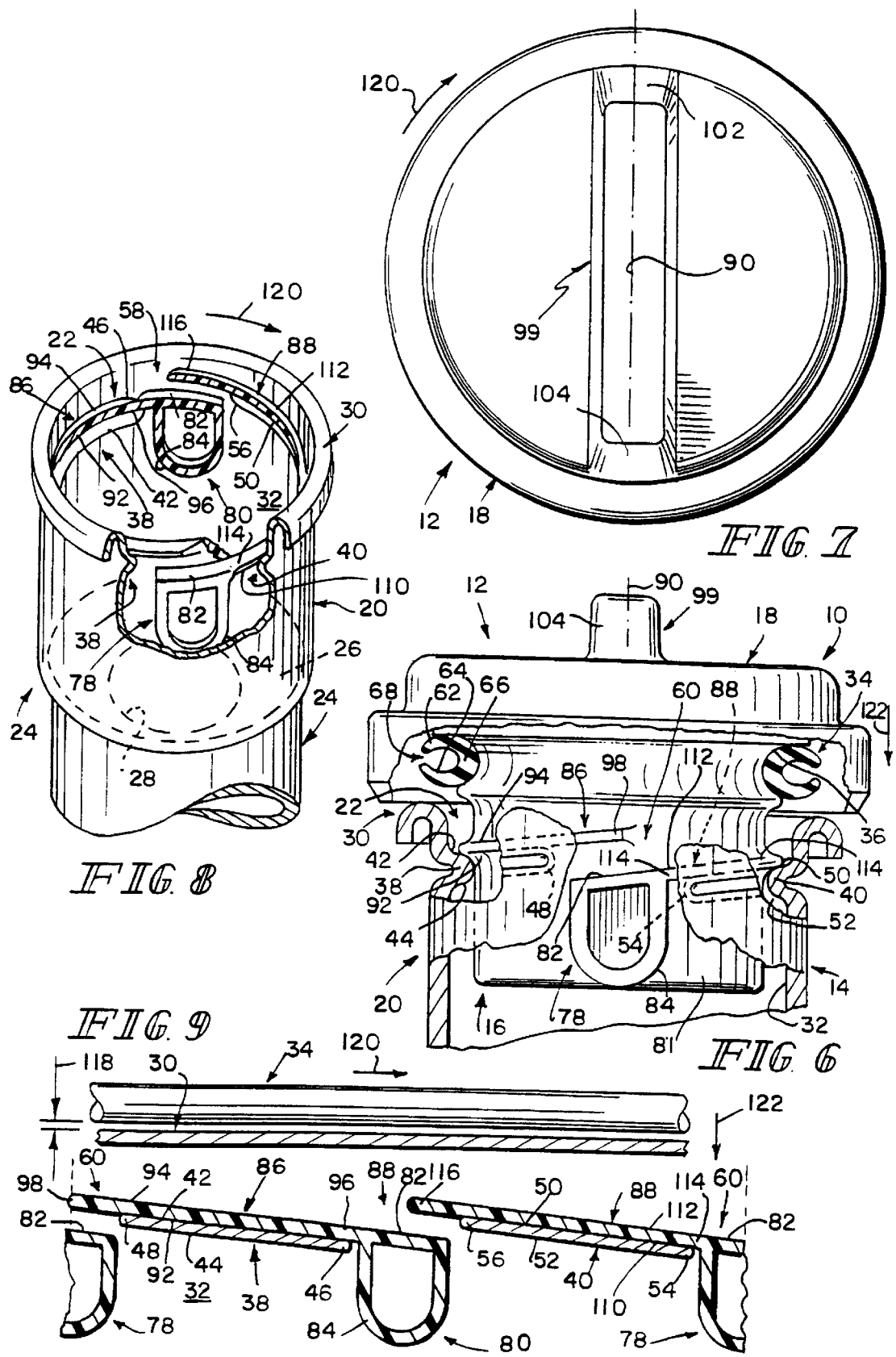

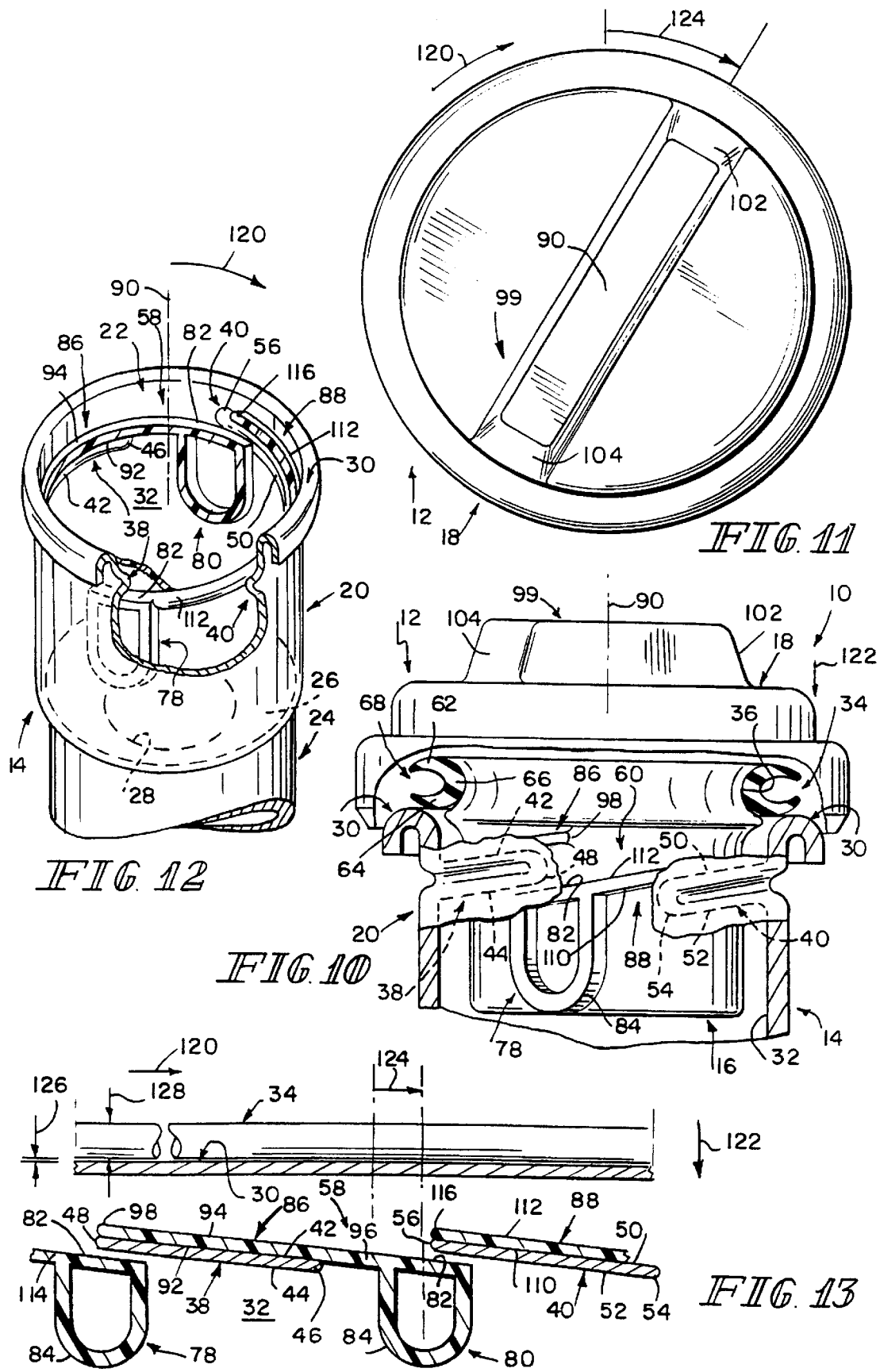

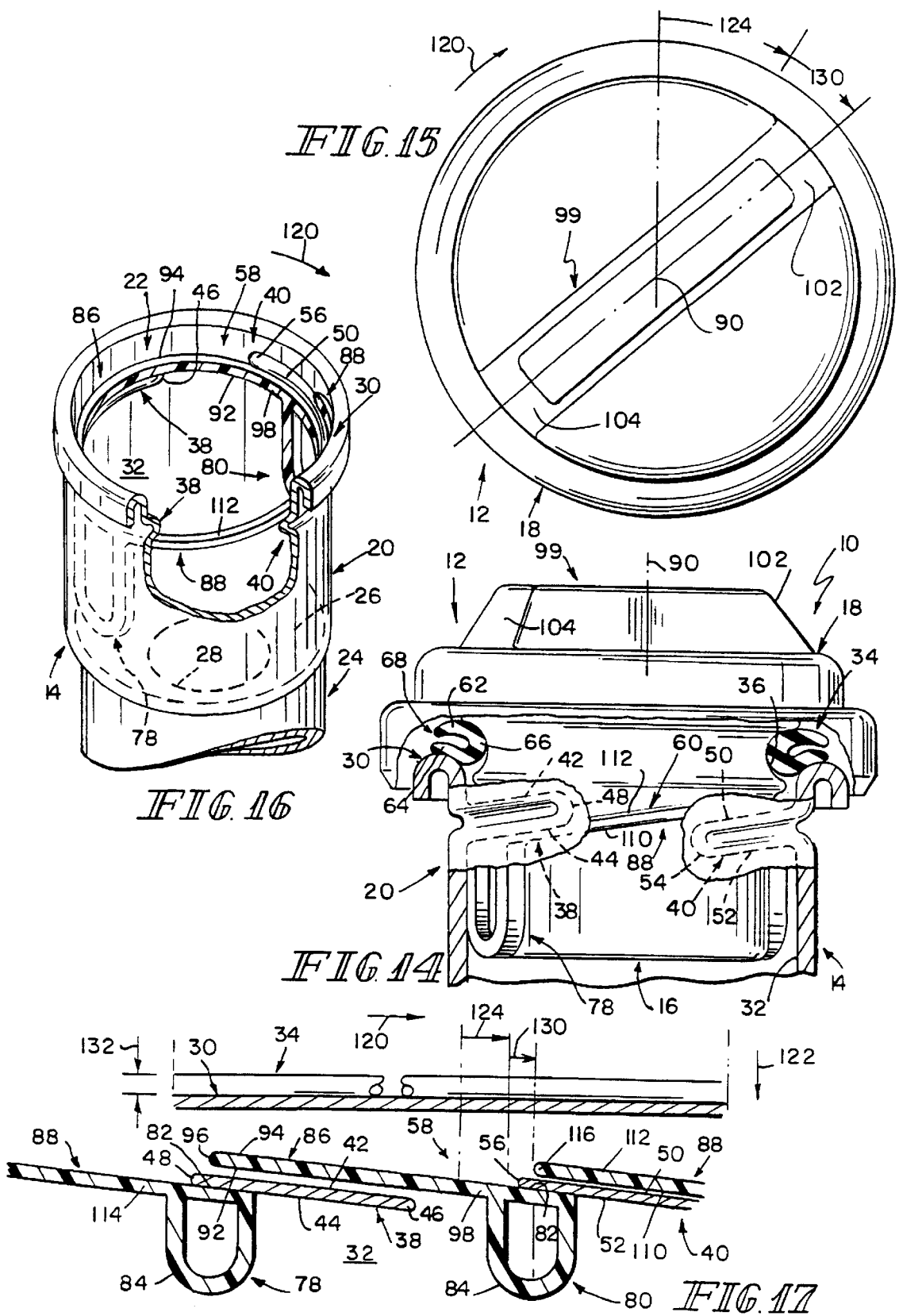

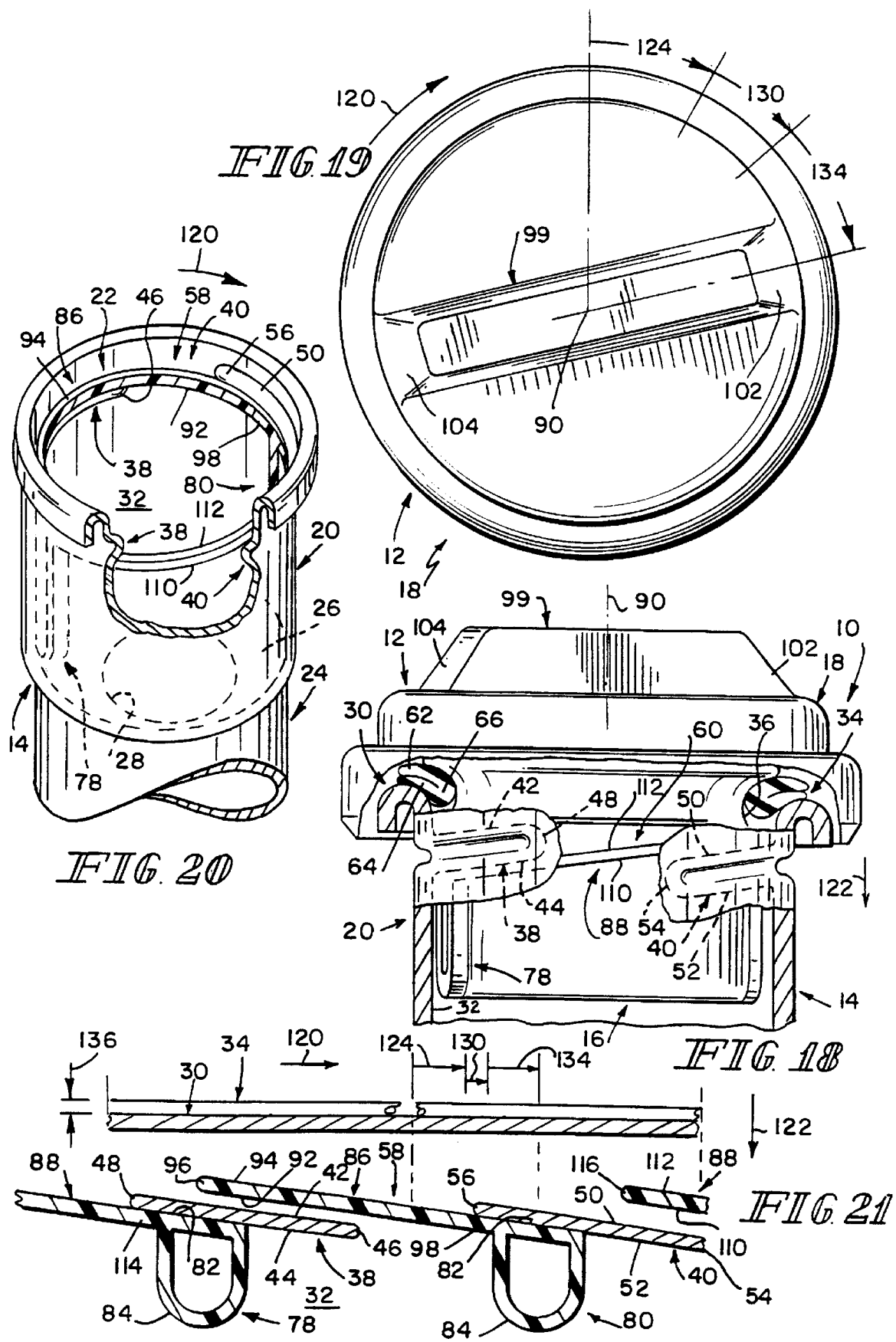

QUICK-ON FILLER NECK CAP

CROSS-REFERENCES TO RELATED APPLICATIONS

This application is a U.S. national application of international application Ser. No. PCT/US98/00863 filed Jan. 16, 1998, which claims priority to U.S. Ser. No. 60/035,394 filed Jan. 16, 1997.

BACKGROUND AND SUMMARY OF THE INVENTION

This invention relates to filler neck caps, and particularly to a rotatable cap for closing the open mouth of a filler neck. More particularly, this invention relates to a filler neck cap engageable with internal flanges formed in the filler neck to cause the cap to be retained quickly and easily in the filler neck.

Conventional caps for closing the filler neck of a vehicle fuel tank typically include a closure member carrying a seal for closing and sealing the mouth of the filler neck and a handle for turning the closure member to mount the closure member and seal in the filler neck. A typical filler neck cap includes a ring-shaped seal made of a resilient gasket material that is compressed between the cap and a filler neck receiving the cap to establish a sealed connection between the cap and the filler neck when the cap is mounted on the filler neck.

Newly manufactured "O-ring" seals of the type used in filler neck caps meet certain stringent size, elasticity, and hardness (durometer) requirements. Over time, however, O-ring seals, as well as other seals, mounted in filler necks tend to shrink, become less elastic, and smaller in cross section due to "O-ring compression set" which occurs when an O-ring seal is exposed to a compression load over time. Such compression loading occurs whenever a cap carrying an O-ring seal is installed in a filler neck. Filler neck cap O-ring seals also degrade over time as a result of normal wear following repeated installations and removals of the cap on and from the filler neck.

According to the present invention, a cap is provided for a filler neck having an open mouth and an internal mounting flange adjacent to the open mouth. The cap comprises a handle, a body coupled to the handle for rotation therewith, an annular seal around the body, an external position-locator lug appended to the body and arranged to lie in spaced-apart relation to the annular seal, and a spiral-shaped cap mounting member appended to the body to lie in a position between the annular seal and the external position-locator lug. The spiral-shaped cap mounting member is adapted to engage against the internal mounting flange of the filler neck upon installation of the body in the filler neck to retain the cap in the filler neck.

In preferred embodiments, the spiral-shaped cap mounting member has a first end positioned to lie either adjacent to or in contact with the external position-locator lug. The external position-indicator lug includes an inclined flange guide. The spiral-shaped cap mounting member includes an annular cap retainer facing toward the handle and being adapted to engage against the internal mounting flange of the filler neck upon installation of the body in the filler neck. The annular cap retainer at the first end of the spiral-shaped cap mounting member is arranged to merge into the inclined flange guide on the position-locator lug.

The body of the cap has a cylindrical exterior surface. The spiral-shaped cap mounting member is appended to the cylindrical exterior surface. The spiral-shaped cap mounting member is formed to include a second end spaced apart from the first end and to have an arc length along the cylindrical exterior surface characterized by a central angle about one hundred sixty degrees. The body has a cylindrical exterior surface and the spiral-shaped cap mounting member is oriented to wind helically around the cylindrical exterior surface.

The filler neck has an outer end including a cylindrical interior side wall and first and second filler neck mounting flanges appended to the cylindrical interior side wall and arranged to define first and second lug-receiving spaces therebetween. The cap preferably includes a cylindrical body that is sized to fit into the outer end of the filler neck and first and second position-locator lugs that are appended to the cylindrical body and arranged to lie in spaced-apart relation to one another so that each position-indicator lug is situated to pass through one of the lug-receiving spaces defined between the first and second filler neck mounting flanges during an initial stage of cap installation in the filler neck. The annular seal is positioned to lie around the cylindrical body and engage a flange appended to the cylindrical body and an annular outer rim included in the outer end of the filler neck during cap installation in the filler neck. First and second spiral-shaped cap mounting members are appended to the cylindrical body and positioned to lie between the overlying annular seal and the underlying position-locator lugs and arranged to engage the first and second filler neck mounting flanges to retain the cap in an installed position in the filler neck and compress the annular seal between the flange appended to the cylindrical body and the annular outer rim included in the filler neck.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a side elevation view of the cap (with portions broken away) and filler neck of FIG. 1 prior to insertion of the cap into the open mouth of the filler neck showing one of the position-locator lugs on the cylindrical body positioned to be passed through a lug-receiving space provided between the first and second filler neck mounting flanges (shown in phantom) formed on a cylindrical interior side wall of the filler neck and showing positioning a first of the cap mounting members over the first filler neck mounting flange and a second of the cap mounting members over the second filler neck mounting flange;

FIG. 3 is a transverse sectional view taken through the cap along line 3—3 of FIG. 2 showing the two spaced-apart, radially outwardly extending, position-locator lugs appended to the cylindrical body of the cap;

FIG. 4 is a transverse sectional view taken through the cap along line 4—4 of FIG. 2 looking down onto a first annular cap retainer formed on the top of the first cap mounting member and a second annular cap retainer formed on the top of the second cap mounting member;

FIG. 5 is top plan view of the filler neck taken along line 5—5 of FIG. 2 showing the rounded annular seat for engaging the O-ring seal carried on the cap, the axially outwardly facing annular outer rims formed on the top of each filler neck mounting flange, and the two lug-receiving spaces formed between adjacent ends of the filler neck mounting flanges and located one hundred eighty degrees (180°) apart to receive the two position-locator lugs appended to the cylindrical body of the cap during cap installation and removal;

FIGS. 6–9 show the position of the cap at an initial stage of cap installation on the filler neck;

FIG. 6 is a side elevation view of the cap and filler neck of FIGS. 1 and 2 showing the cap as it appears when it is first inserted into the mouth of the filler neck and then positioned to "rest" on the filler neck mounting flanges without engaging the O-ring seal against the filler neck and showing engagement of annular cap supporters formed on the bottoms of the cap mounting members and the outer rims formed on the tops of the filler neck mounting flanges to support the cap in an initial position in the filler neck;

FIG. 7 is a top plan view of the handle assembly of the cap of FIG. 6;

FIG. 8 is a perspective view of the cap and filler neck of FIG. 6, with portions of the cap and filler neck broken away, showing positioning of a "rear" position-locator lug on the cap in a lug-receiving space formed between spaced-apart ends of the two filler neck mounting flanges;

FIG. 9 is a diagrammatic view of the cap and filler neck of FIGS. 6–8 showing a "flat development" of the two filler neck mounting flanges, the two position-locator lugs and mounting members on the cap, and the vertical spacing between the O-ring seal carried by the cap and the underlying seat on the filler neck for engaging the O-ring seal;

FIGS. 10–13 show the position of the cap at a later stage of cap installation on the filler neck;

FIG. 10 is a side elevation view similar to FIG. 6 showing the cap after it has been rotated about ten degrees (10°) in a clockwise direction about its axis of rotation from the initial position shown in FIGS. 6–8 and just prior to engagement of the O-ring seal on the cap and the underlying rounded annular O-ring seal seat at the mouth of the filler neck;

FIG. 11 is a top plan view of the handle assembly of FIG. 10;

FIG. 12 is a perspective view similar to FIG. 8 showing clockwise movement of the rear position-locator lug and its trailing cap mounting member out of the lug-receiving space at the "rear" of the filler neck and toward the second filler neck mounting flange;

FIG. 13 is a diagrammatic flat development view of the cap and filler neck of FIGS. 10–12 showing engagement of the annular cap supporter on the bottom of each cap mounting member with the underlying outer rim on the top of one of the filler neck mounting flanges just before the flange guides on top of each position-locator flanges engage the inner rims on the bottom of the filler neck mounting flanges and the O-ring seal engages the underlying O-ring seal seat on the filler neck;

FIGS. 14–17 show the position of the cap in a normal fully installed position on the filler neck;

FIG. 14 is a side elevation view similar to FIGS. 6 and 10 showing the cap after it has been rotated further, in clockwise direction, a few degrees past the position shown in FIG. 10 to a fully installed position in the filler neck wherein the O-ring seal is compressed between the cap and the filler neck and the inner rims of the filler neck mounting flanges engage the flange guides on the position-locator lugs and the cap retainers on the cap mounting members;

FIG. 15 is top plan view of the handle assembly of FIG. 14;

FIG. 16 is a perspective view similar to FIGS. 8 and 12 showing further clockwise movement of the rear position-locator lug and its trailing cap mounting member to engage the inner rim of the second filler neck mounting flange;

FIG. 17 is a diagrammatic flat development view of the cap and filler neck of FIGS. 14–16 showing engagement of flange guides on each position-locator lug and the cap retainers on each cap mounting member with an inner rim on one of the overlying filler neck flange members to cause the cap to be retained securely in the normal fully installed position within the filler neck and the O-ring seal to be compressed in accordance with a predetermined specification to establish a liquid and vapor seal between the cap and the filler neck;

FIGS. 18–21 show the position of the cap in a special installation position of the cap on the filler neck that may occur if the O-ring seal degrades over time from its "original equipment" specification;

FIG. 18 is a side elevation view similar to FIGS. 6, 10, and 14 showing the cap after it has been rotated, in a clockwise direction, a few degrees past the normal fully installed position shown in FIG. 10 to compress the O-ring seal further to a point at which it functions as an effective liquid and vapor seal between the cap and the filler neck;

FIG. 19 is a top plan view of the handle assembly of FIG. 18;

FIG. 20 is a perspective view similar to FIGS. 8, 12, and 16 showing still further clockwise movement of the rear position-locator lug and its trailing cap mounting member past a position shown in FIG. 10, which position corresponds to the normal fully installed position of the cap on the filler neck; and FIG. 21 is a diagrammatic flat development view of the cap and filler neck of FIGS. 18–20 showing the further movement of the rear position-locator lug and its trailing cap member relative to the overlying filler neck flange member referred to in the description of FIG. 20.

DETAILED DESCRIPTION OF THE DRAWINGS

Figure 1:
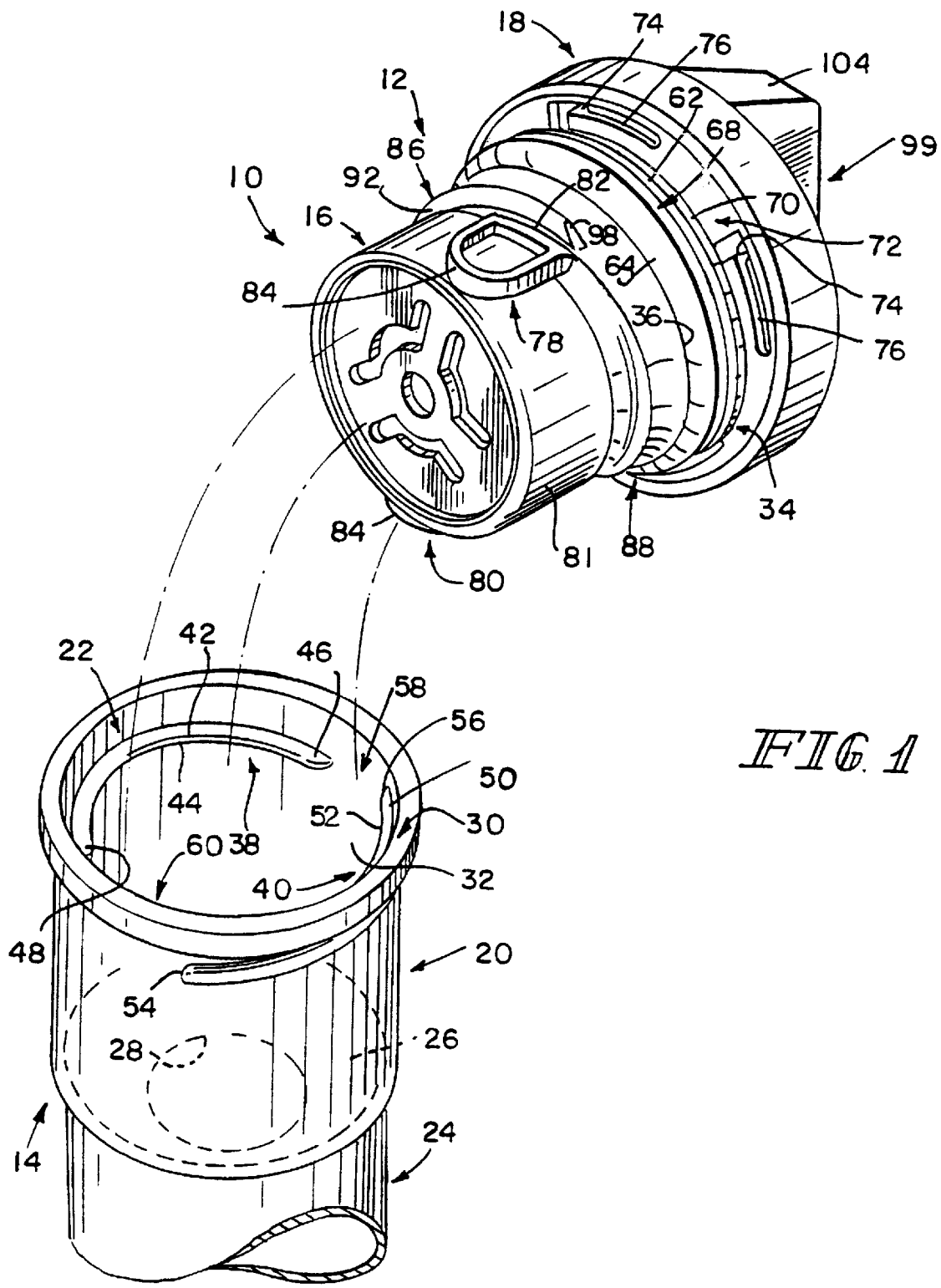
FIG. 1 is an exploded perspective view of a filler neck closure assembly in accordance with the present invention showing a filler neck carrying a pair of spaced-apart internal mounting flanges and a quick-on cap including a cylindrical body carrying an O-ring seal and pairs of external position-locator lugs and helical mounting members below the O-ring seal and a handle assembly for rotating the cylindrical body relative to the filler neck during chip installation and removal.

More and more vehicle drivers are using the self-service bays at gasoline stations and filling their own fuel tanks. Some people have found that it is difficult to remove and install a conventional filler neck cap during refueling. Cap 12 is readily installable on and removable from filler neck 14 by a user without a lot of effort and is configured to establish a sturdy sealed connection between cap 12 and filler neck 14 consistently during use and to compensate for any O-ring compression set that may develop over the useful life of cap 12 and its O-ring seal 34.

A closure assembly 10 in accordance with the present invention is illustrated in FIG. 1. Closure assembly 10 includes a cap 12 configured to mount on a filler neck 14. Cap 12 includes a cylindrical body 16 and an outer shell or handle 18 configured to provide a hand grip. Filler neck 14 includes a cap-receiving outer end 20 having an open mouth 22 and a fuel-delivery tube 24 coupled to outer end 20. A partition 26 formed to include a nozzle-receiving aperture 28 is positioned to lie in filler neck 14 and aperture 28 is sized to receive a liquid fuel-dispensing nozzle (not shown) therein.

In a preferred embodiment, filler neck 14 is made of stainless steel to include outlet end 20 and fuel-delivery tube 24 and partition 26 is an optional insert. In another embodiment, outer end 20 is a metal insert formed to include partition 26 and sized to fit in an open end of a filler neck made of metal or plastics material. It is within the scope of this invention to mount a cap-receiving outer end 20 including mounting flanges in accordance with the present invention in, on, or to a filler neck to enable a quick-on cap in accordance with the present invention to be mounted on the filler neck quickly and easily by a user.

Outer end 20 of filler neck 14 includes a rounded annular O-ring seal-engaging seat 30 at mouth 22 as shown, for example, in FIGS. 1, 2, and 8. Outer end 20 also includes a cylindrical interior side wall 32 extending axially inwardly from seat 30 toward partition 26. Cylindrical interior side wall 32 is sized to receive cylindrical body 16 of cap 12 when cap 12 is mounted on filler neck 14 and annular seat 30 is sized to engage a resilient O-ring seal 34 mounted in an annular groove 36 formed in cylindrical body 16 of cap 12.

Outer end 20 of filler neck 14 is formed to include first and second filler neck mounting flanges 38, 40 on cylindrical interior side wall 32 as shown, for example, in FIGS. 1, 2, 6, and 8. Filler neck mounting flanges 38, 40 function in a manner described below to support and retain cap 12 in a position closing and sealing open mouth 22 in filler neck 14. Filler neck mounting flanges 38, 40 cooperate with certain portions of cap 12 to enable cap 12 to be installed in filler neck 14 quickly and easily by a user.

An annular outer rim 42 facing in an axially outward direction toward cap 12 is formed on the top of first filler neck mounting flange 38 and an annular inner rim 44 facing in an axially inward direction toward partition 26 and fuel-delivery tube 24 is formed on the bottom of first filler neck mounting flange 38. First filler neck mounting flange 38 is also formed to include a first end 46 and a second end 48 and to have an arc length along cylindrical interior wall 32 characterized by a central angle of about one hundred forty degrees (140°).

An annular outer rim 50 facing in an axially outward direction toward cap 12 is formed on the top of second filler neck mounting flange 40 and an annular inner rim 52 facing in an axially inward direction toward partition 26 and fuel-delivery tube 24 is formed on the bottom of second filler neck mounting flange 40. Second filler neck mounting flange 40 is also formed to include a first end 54 and a second end 56 and to have an arc length along cylindrical interior wall 32 characterized by a central angle of about one hundred forty degrees (140°).

One role of filler neck mounting flanges 38, 40 is to support cap 12 in filler neck 14 during an initial stage of cap installation and then to retain cap 12 securely in filler neck 14 once cap 12 is installed in filler neck 14. Filler neck mounting flanges 38, 40 also cooperate to define two spaces for receiving exterior lugs 78, 80 appended to cylindrical body 16 of cap 12 during the initial stage of cap installation to locate cap 12 properly in filler neck 14 during cap installation. First end 46 of filler neck mounting flange 38 and second end 56 of filler neck mounting flange 40 are positioned to lie in spaced-apart relation to one another to define a first lug-receiving space 58 therebetween as shown, for example, in FIGS. 1 and 5. Likewise, second end 48 of filler neck mounting flange 38 and first end 54 of filler neck mounting flange 40 are positioned to lie in spaced-apart relation to one another to define a second lug-receiving space 60 therebetween. Lugs 78, 80 appended to cap 12 will pass axially through an entry zone defined by the two lug-receiving spaces 58, 60 formed in filler neck 14 during an initial stage of cap installation in the manner suggested, for example, in FIG. 1, to position cap 12 properly in filler neck 14 in the manner described below.

As shown in FIGS. 1 and 2, cylindrical body 16 is formed to include an annular groove 36 receiving a resilient O-ring seal 34. In the illustrated embodiment, O-ring seal 34 includes a rounded annular top lip 62, a rounded annular bottom lip 64, and an annular web 66 interconnecting lips 62, 64 and normally positioning lips 62, 64 in axially spaced-apart relation from one another to define an annular gap 68 therebetween as shown, for example, in FIG. 2. It is within the scope of the present invention to mount filler neck seals or gaskets other than O-ring seal 34 on cap 12.

An annular flange 70 is appended to an axially outer edge of cylindrical body 16 and positioned to overlie annular top lip 62 of O-ring seal 34 as shown, for example, in FIGS. 1 and 2. Annular flange 70 functions to urge O-ring seal 34 inwardly against annular seat 30 on filler neck 14 during cap installation in filler neck 14 as shown, for example, in FIGS. 14 and 18. O-ring seal 34 is made of a resilient material and is compressed during cap installation to establish a liquid and vapor seal between cap 12 and filler neck 14 as shown, for example, in FIGS. 14 and 18.

An annular outer ring 72 is appended to the axially outer edge of cylindrical body 16 and positioned to engage handle 18. To provide a driving connection between handle 18 and cylindrical body 16, pawl teeth 74 are provided on flexible arms 76 included in annular outer ring 72. Pawl teeth 74 cooperate with a suitable drive mechanism (not shown) provided inside handle 18 to provide a torque-override connection between handle 18 and cylindrical body 16. Specifically, the pawl teeth 74 and the drive mechanism (not shown) cooperate to provide a torque-override driving connection in the cap-advancing direction to prevent over-compression of O-ring seal 34 during cap-installation. In the cap-removal direction, the pawl teeth 74 and the drive mechanism cooperate to provide a direct-drive connection to remove cap 12 from filler neck 14. It is also within the scope of the present invention to couple handle 18 to cylindrical body to establish a direct-drive connection therebetween in cap-advancing and cap-removal directions without using a torque-override system.

A pair of position-locator lugs 78, 80 is appended to an exterior surface 81 at an axially inner end of cylindrical body 16 as shown, for example, in FIGS. 1–3. The position-locator lugs 78, 80 are arranged in spaced-apart relation to one another so that each position-locator lug will pass through one of the lug-receiving spaces 58, 60 defined by filler neck mounting flanges 38, 40 during an initial stage of cap installation. Each position-locator lug 78, 80 includes an inclined (with respect to the horizontal) flange guide 82 and a rounded guide edge 84 depending from flange guide 82 as shown best in FIG. 2. Position-indicator lug 78 is positioned to lie about one hundred eighty degrees (180°) away from position-indicator lug 80 about the circumference of cylindrical exterior surface 81 as shown in FIGS. 1 and 3.

First and second cap mounting members 86, 88 are appended to exterior surface 81 of cylindrical body 16 of cap 12 as shown, for example, in FIGS. 1 and 2. Cap mounting members 86, 88 are arranged to support cap 12 in filler neck 14 during an initial stage of cap installation as shown in FIG. 6 and retain cap 12 securely in filler neck 14 following cap installation as shown in FIGS. 14 and 18. Cap mounting members 86, 88 are configured to cooperate with filler neck mounting flanges 38, 40 to enable cap 12 to be installed in and removed from filler neck 14 quickly and easily by a user.

Each cap mounting member 86, 88 is a spiral-shaped (e.g., helical) appendage coupled and oriented to wind spirally (e.g., helically) around cylindrical body 16 and its axis of rotation 90. Each cap mounting member 86, 88 is formed to include an annular cap supporter on a bottom side thereof and an annular cap retainer on a top side thereof as described below.

An annular cap supporter 92 facing in an axially inward direction toward filler neck 14 is formed on the bottom of first cap mounting member 86 and an annular cap retainer 94 facing in an axially outward direction toward handle 18 is formed on the top of first cap mounting member 86. First cap mounting member 86 is also formed to include a first end 96 and a second end 98 and to have an arc length along cylindrical exterior surface 81 characterized by a central angle of about one hundred sixty degrees (160°). First end 96 of first cap mounting member 86 is positioned to lie adjacent to or in contact with position-locator lug 80 to cause annular cap retainer 94 at first end 96 to mate with and merge into inclined flange guide 82 on position-locator lug 80.

An annular cap supporter 110 facing in an axially inward direction toward filler neck 14 is formed on the bottom of second cap mounting member 88 and an annular cap retainer 112 facing in an axially outward direction toward handle 18 is formed on the top of second cap mounting member 88. Second cap mounting member 88 is also formed to include a first end 114 and a second end 116 and to have an arc length along cylindrical exterior surface 81 characterized by a central angle of about one hundred sixty degrees (160°). First end 114 of second cap mounting member 88 is positioned to lie adjacent to or in contact with position-locator lug 78 to cause annular cap retainer 112 at first end 114 to mate with and merge into inclined flange guide 82 on position-locator lug 78.

In a presently preferred embodiment, first cap mounting member 86 is sized and arranged so that second end 98 lies above and in spaced-apart relation to underlying flange guide 82 formed on top of position-locator lug 78 as shown in FIGS. 2 and 4. Likewise, second cap mounting member 88 is sized and arranged so that second end 116 lies above and in spaced-apart relation to flange guide 82 on top of position-locator lug 80. Such positioning and vertical spacing of the position-locator lugs and the cap mounting members enables (1) the second end 48 of first filler neck mounting flange 38 to be passed through a space provided between guide flange 82 on position-locator lug 78 and second end 98 on first cap mounting member 86 and (2) the second end 56 of second filler neck mounting flange 40 to be passed through a space provided between guide flange 82 on position-locator lug 80 and second end 116 on second cap mounting member 88 during installation of cap 10 on filler neck 14 as shown diagrammatically in FIGS. 13, 17, and 21.

During cap installation, cap 10 is first moved relative to filler neck 14 from the position shown in FIG. 1 to the position shown in FIG. 2. Cap 10 is then moved toward filler neck as shown in FIG. 6 to insert cylindrical body 16 of cap 10 into outer end 20 of filler neck 14 through open mouth 22 and to engage annular cap supporters 92, 110 on cap mounting members 86, 88.against annular outer rims 42, 50 on filler neck mounting flanges 38, 40. In this "initial position," cap 10 is supported in a rest position on filler neck mounting flanges 38, 40 formed on cylindrical interior side wall 32 of filler neck 14 without engaging O-ring seal 34 carried on cylindrical body 16 against annular seat 30 provided around mouth 22 of filler neck 14. At the same time, position-locator lugs 78, 80 included in cap 10 have been passed downwardly into the lug-receiving spaces 58, 60 formed between filler neck mounting flanges 38, 40 to locate the position of cap 10 properly in filler neck 14 during this initial stage of cap installation. As shown in FIGS. 6 and 7, handle 18 normally occupies an initial "rotational" orientation with respect to filler neck 14 during this first stage of cap installation in filler neck 14. Handle 18 includes a grip portion 99 that passes through axis of rotation 90 and has one end 102 at a twelve o'clock position and an opposite end 104 at a six o'clock position.

Referring now to the "flat development" view shown in FIG. 9, O-ring 34 is supported to lie distance 118 above a top surface on annular seat 30 upon engagement of annular cap supporters 92, 110 of cap mounting members 86, 88 and underlying annular outer rims 42, 50 of filler neck mounting flanges 38, 40. As cap 10 is later rotated in a clockwise cap-advancing direction 120 during cap installation, annular cap supports 92, 110 will slide and cam on annular outer rims 42, 50 under the weight of cap 10 and applied force provided by the cap installer to urge O-ring seal 34 in direction 122 to engage and seal against annular seat 30 of filler neck 14 as shown, for example, in FIGS. 10 and 13. Once handle 18 has been rotated from the initial position shown in FIG. 7 through angle 124 of, for example, about ten degrees (10°) as shown in FIG. 11, O-ring seal 34 has moved in direction 122 closer to annular seat 30 so that O-ring seal 34 now lies distance 126 from a top surface on annular seat as shown in FIG. 13. At this point, the O-ring seal 34 remains in an uncompressed state and has an effective vertical height dimension 128 as shown in FIG. 13.

Continued rotation of handle 18 in clockwise direction 120 by a user through angle 130 of, for example, about five degrees (5°) as shown in FIG. 15 causes inclined flange guides 82 on top of position-locator lugs 78, 80 to enter a ramping zone and engage against inner rims 44, 52 on filler neck mounting flanges 38, 40 so as to retain cap 10 in a normal fully installed position in filler neck 14. As shown, for example, in FIGS. 14, 16, and 17, the position-locator lugs 78, 80 have been moved mostly out of the lug-receiving spaces 58, 60 formed between the first and second filler neck mounting flanges 38, 40 to engage inner rims 44, 52 on filler neck mounting flanges 38, 40. In the normal fully installed position in the filler neck shown in FIGS. 14 and 17, O-ring seal 34 has been compressed to assume an effective vertical height 132 as shown in FIG. 17 and establish a liquid and vapor seal between cap 10 and filler neck 14.

A typical filler neck cap includes an O-ring seal made of a resilient gasket material that is compressed between the cap and a filler neck receiving the cap to establish a sealed connection between the cap and the filler neck when the cap is mounted on the filler neck. Newly manufactured O-ring seals of the type used in filler neck caps meet certain stringent size, elasticity, and hardness (durometer) requirements. Over time, however, O-ring seals mounted in filler necks tend to shrink, become less elastic, and smaller in cross section due to "O-ring compression set" which occurs when an O-ring seal is exposed to a compression load over time. Such compression loading occurs whenever a cap carrying an O-ring seal is installed in a filler neck, Filler neck cap O-ring seals also degrade over time as a result of normal wear following repeated installations and removals of the cap on and from the filler neck.

Cap 10 is configured to engage filler neck 14 so as to be rotatable further in a clockwise direction 120 past the normal fully installed position shown, for example, in FIGS. 14–17 to compress O-ring seal 34 further between cap 10 and annular seat 30 on filler neck 14. Such further compression of O-ring seal 34 during cap installation is desirable in cases where O-ring seal 34 has changed due to O-ring compression set and/or has worn due to age and/or use. Cap 10 and filler neck 14 are designed to allow for rotation of cap 10 relative to filler neck 14 past the normal fully installed position of cap 10 on filler neck 14 to compensate for O-ring compression set which occurs when the O-ring is exposed to a load over a period of time and for normal wear following repeated installations and removals of cap 10 on and from filler neck 14.

As shown, for example, in FIGS. 18–21, in appropriate cases of the type just described, handle 18 can be rotated in clockwise direction 120 by a user through angle 134 of, for example, about ten degrees (10°) to cause O-ring seal 34 to be compressed further to assume an effective vertical height 136 that is less than the effective vertical height 132 of O-ring seal 34 in its normal fully installed position. Such "overtravel" of cap 10 in filler neck 14 produces additional desirable O-ring compression during cap installation. Although angle 134 is shown in the illustrated embodiment to be about ten degrees (10°), angle 134 can be varied in accordance with the present invention during cap installation by the user to create sufficient compression of O-ring seal 34 because no structural impediment to rotation of cap 10 in direction 120 relative to filler neck 14 exists in cap 10 and filler neck 14 to block rotation of cap 10 about axis of rotation 90 through an angle 134 having a magnitude great enough to compress O-ring seal 34 sufficiently.

As shown, for example, in FIG. 21, rotation of cap 10 in direction 120 causes guide flanges 82 on position-locator lugs 78, 80 to move further into the ramping zone and to slide and cam further on annular inner rims 44, 52 of filler neck mounting flanges 38, 40 and causes annular cap retainers 94, 112 on cap mounting members 86, 88 to first engage and then slide and cam on annular inner rims 44, 52 of filler neck mounting flanges 38, 40 in a position trailing the advancing guide flanges 82 on position-locator lugs 78, 80. As cap 10 rotates about axis of rotation 90 during cap installation through an increasing angle 134, the result is unimpeded engagement of a greater length of annular cap retainers 94, 112 on cap mounting members 86, 88 against annular inner rims 44, 52 of filler neck mounting flanges 38, 40 in the vamping zone. As shown, for example, in FIG. 21, position-locator lugs 78, 80 extend inwardly in direction 122 below cap mounting members 86, 88.

Although the invention has been described in detail with reference to certain preferred embodiments, variations and modifications exist within the scope and spirit of the invention as described and defined in the following claims.

What is claimed is:

1. A cap for a filler neck having an open mouth and an internal mounting flange mechanism adjacent to the open mouth, the cap comprising
   a handle,
   a body coupled to the handle for rotation therewith,
   an annular seal around the body,
   an external position-locator lug appended to the body and arranged to lie in spaced-apart relation to the annular seal, and
   at least two spiral-shaped cap mounting members appended to the body to lie in a position between the annular seal and the external position-locator lug and adapted to engage against the internal mounting flange mechanism of the filler neck upon installation of the body in the filler neck to retain the cap in the filler neck.

2. The cap of claim 1, wherein one of the at least two spiral-shaped cap mounting members has a first end positioned to lie one of adjacent to and in contact with the external position-locator lug.

3. The cap of claim 2, wherein the external position-indicator lug includes an inclined flange guide, the one spiral-shaped cap mounting member includes an annular cap retainer facing toward the handle and being adapted to engage against the internal mounting flange mechanism of the filler neck upon installation of the body in the filler neck, and the annular cap retainer at the first end of the one spiral-shaped cap mounting member is arranged to merge into the inclined flange guide on the position-locator lug.

4. The cap of claim 3, wherein the external position-locator lug further includes a rounded guide edge depending from the flange guide and extending below the one spiral-shaped cap mounting member in a direction away from the handle.

5. The cap of claim 2, wherein the body has a cylindrical exterior surface, the one spiral-shaped cap mounting member is appended to the cylindrical exterior surface, and the one spiral-shaped cap mounting member is formed to include a second end spaced apart from the first end and to have an arc length along the cylindrical exterior surface characterized by a central angle of more than sixty degrees.

6. The cap of claim 5, wherein the central angle is about one hundred sixty degrees.

7. The cap of claim 1, wherein the body has a cylindrical exterior surface and one of the at least two spiral-shaped cap mounting members is oriented to wind helically around the cylindrical exterior surface.

8. The cap of claim 7, wherein the one spiral-shaped cap mounting member has an arc length along the cylindrical interior surface of about one hundred sixty degrees.

9. The cap of claim 7, wherein the external position-indicator lug includes an inclined flange guide facing toward the annular seal and adapted to engage against the internal mounting flange mechanism of the filler neck to retain the cap in the filler neck.

10. The cap of claim 9, wherein the one spiral-shaped cap mounting member includes an annular cap retainer arranged to face toward the annular seal and positioned to mate with and merge into the inclined flange guide of the external position-indicator lug at one end of the one spiral-shaped cap-mounting member.

11. The cap of claim 9, wherein the one spiral-shaped cap mounting member includes an annular cap retainer arranged to face toward the annular seal and the annular cap retainer is adapted to engage the internal mounting flange mechanism of the filler neck along with the inclined flange guide to retain the cap in the filler neck.

12. The cap of claim 9, wherein the one spiral-shaped cap mounting member includes an annular cap supporter arranged to face away from the annular seal and adapted to engage against the internal mounting flange mechanism of the filler neck during an early stage of cap installation in the filler neck.

13. A cap for a filler neck having an open mouth and a pair of internal mounting flanges adjacent to the open mouth, the cap comprising
   a handle,
   a body coupled to the handle for rotation therewith,
   an annular seal positioned to lie around the body, a pair of external position-locator lugs appended to the body, and a pair of spiral-shaped cap mounting members appended to the body and arranged to lie in a position between the annular seal and the pair of external position-locator lugs and adapted to engage against the internal mounting flanges of the filler neck upon installation of the body in the filler neck to retain the cap in the filler neck.

14. The cap of claim 13, wherein the external position-locator lugs are positioned to lie about one hundred eighty degrees apart from one another in circumferentially spaced-apart relation on a cylindrical exterior surface of the body and the pair of spiral-shaped cap mounting members are appended to the cylindrical exterior surface of the body and oriented to wind spirally around the cylindrical exterior surface in a central portion of the body located between the annular seal and the underlying pair of external position-locator lugs.

15. The cap of claim 14, wherein each of the external position-locator lugs includes an inclined flange guide facing toward the annular seal and each of the spiral-shaped cap mounting members includes an annular cap retainer facing toward the annular seal.

16. The cap of claim 14, wherein each of the spirally shaped cap mounting members has an arc length along the cylindrical exterior surface characterized by a central angle of less than one hundred eighty degrees.

17. The cap of claim 16, wherein the central angle is about one hundred sixty degrees.

18. A closure assembly comprising
a filler neck having an outer end including a cylindrical interior side wall and first and second filler neck mounting flanges appended to the cylindrical interior side wall and arranged to define first and second lug-receiving spaces therebetween, and a cap including a cylindrical body sized to fit into the outer end of the filler neck, first and second position-locator lugs appended to the cylindrical body and arranged to lie in spaced-apart relation to one another so that each position-indicator lug is situated to pass through one of the lug-receiving spaces defined between the first and second filler neck mounting flanges during an initial stage of cap installation in the filler neck, an annular seal positioned to lie around the cylindrical body and engage a flange appended to the cylindrical body and an annular outer rim included in the outer end of the filler neck during cap installation in the filler neck, and first and second spiral-shaped cap mounting members appended to the cylindrical body and positioned to lie between the overlying annular seal and the underlying position-locator lugs and arranged to engage the first and second filler neck mounting flanges to retain the cap in an installed position in the filler neck and compress the annular seal between the flange appended to the cylindrical body and the annular outer rim included in the filler neck.

19. The closure assembly of claim 18, wherein the cylindrical body includes an axially inner end and an axially outer end, the first and second position-indicator lugs are appended to the axially inner end, the flange is positioned to lie at the axially outer end, and the first and second cap mounting members are appended to a central portion of the cylindrical body and positioned to lie between the axially inner and outer ends.

20. The closure assembly of claim 19, further comprising a handle including a base coupled to the axially outer end of the cylindrical body and an annular skirt appended to the base and arranged to surround the flange appended to the cylindrical base and the annular seal arranged to engage the flange.

21. The closure assembly of claim 18, wherein each of the first and second filler neck mounting flanges is spiral-shaped.

22. The closure assembly of claim 21, wherein each of the first and second filler neck mounting flanges is formed to include a first end and a second end and to have an arc length along the cylindrical interior side wall of the filler neck characterized by a central angle of about one hundred forty degrees.

23. The closure assembly of claim 21, wherein each of the spiral-shaped first and second filler neck mounting flanges includes a spiral-shaped annular outer rim facing toward the annular seal and an underlying spiral-shaped annular inner rim facing away from the annular seal.

24. The closure assembly of claim 23, wherein each of the spiral-shaped annular outer rims and the cap mounting members have a pitch and the pitch of each of the spiral-shaped annular outer rims is equivalent to the pitch of each of the spiral-shaped cap mounting members to cause each of the spiral-shaped annular outer rims to mate with each of the first and second cap mounting members.

25. The closure assembly of claim 23, wherein each of the spiral-shaped annular inner rims and the cap mounting members have a pitch and the pitch of each of the spiral-shaped annular inner rims is equivalent to the pitch of each of the spiral-shaped cap mounting members to cause each of the spiral-shaped annular inner rims to mate with each of the first and second cap mounting members.

26. The closure assembly of claim 21, wherein each of the spiral-shaped annular first and second filler neck mounting flanges and the cap mounting members have a pitch and the pitch of each of the spiral-shaped annular first and second filler neck mounting flanges is equivalent to the pitch of each of the spiral-shaped cap mounting members to cause each of the spiral-shaped annular first and second filler neck mounting flanges to mate with each of the first and second cap mounting members.

27. The closure assembly of claim 18, wherein the first spiral-shaped cap mounting member has a first end positioned to lie one of adjacent to and in contact with the first position-locator lug and the second spiral-shaped cap mounting member has a first end positioned to lie one of adjacent to and in contact with the second position-locator lug.

28. The closure assembly of claim 27, wherein the first spiral-shaped cap mounting member has a second end positioned to lie in spaced-apart relation to the second position-locator lug to define a first space therebetween sized to receive one of the filler neck mounting flanges therein.

29. The closure assembly of claim 28, wherein the second spiral-shaped cap mounting member has a second end positioned to lie in spaced-apart relation to the first position-locator lug to define a second flange-receiving space therebetween sized to receive one of the filler neck mounting flanges therein.

30. A method for closing a filler neck having an open mouth, the method comprising the steps of
providing an annular outer rim on the filler neck and first and second filler neck mounting flanges on a cylindrical interior side wall of the filler neck in axially inwardly spaced-apart relation from the annular outer rim to define a first lug-receiving space between first ends of the first and second filler neck mounting flanges and a second lug-receiving space between second ends of the first and second filler neck mounting flanges, each of the first and second filler neck mounting flanges being spiral-shaped, providing a cap including a body sized to fit into the filler neck through the open mouth, an annular seal mounted on the body, first and second position-indicator lugs appended to the body and arranged to lie in spaced-apart relation to one another, and first and second cap mounting members appended to the body and positioned to lie between the annular seal and the first and second position-locator lugs, each of the first and second cap mounting members being spiral-shaped, moving the body of the cap into the filler neck one of to pass the first and second position-locator lugs through the first and second lug-receiving spaces and to engage the first and second position-locator lugs on the first and second filler neck mounting flanges and guide the first and second position-locator lugs along the first and second filler neck mounting flanges until the first and second position-locator lugs reach and pass through the first and second lug-receiving spaces, and then rotating the body in the filler neck about an axis of rotation to cause the first position-locator lug and cap mounting member to engage an underside of the first filler neck mounting flange and to cause the second position-locator lug and cap mounting member to engage an underside of the second filler neck mounting flange so that the annular seal is compressed to establish a liquid fuel and vapor seal between the cap and the filler neck.

31. The method of claim 30, wherein each of the first and second cap mounting members has an arc length along the body characterized by a central angle of about one hundred sixty degrees.

* * * * *